United States Patent
Gahm et al.

(10) Patent No.: US 9,402,114 B2
(45) Date of Patent: Jul. 26, 2016

(54) SYSTEM AND METHOD FOR PROVIDING RANDOMIZATION IN ADAPTIVE BITRATE STREAMING ENVIRONMENTS

(75) Inventors: Joshua B. Gahm, Newtonville, MA (US); Scott C. Labrozzi, Cary, NC (US); David R. Oran, Cambridge, MA (US); Ali C. Begen, London (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 140 days.

(21) Appl. No.: 13/552,212

(22) Filed: Jul. 18, 2012

(65) Prior Publication Data

US 2014/0025835 A1    Jan. 23, 2014

(51) Int. Cl.
*H04N 21/845* (2011.01)
*H04N 21/24* (2011.01)
*H04N 21/2343* (2011.01)

(52) U.S. Cl.
CPC ....... *H04N 21/8451* (2013.01); *H04N 21/2401* (2013.01); *H04N 21/23439* (2013.01); *H04N 21/8456* (2013.01)

(58) Field of Classification Search
CPC ........................................ H04L 65/00
USPC ........................................ 709/713
See application file for complete search history.

(56) References Cited

U.S. PATENT DOCUMENTS

| | | | |
|---|---|---|---|
| 5,978,357 A | 11/1999 | Charny | |
| 6,052,361 A | 4/2000 | Ansari et al. | |
| 6,229,789 B1 | 5/2001 | Simpson et al. | |
| 6,279,039 B1 | 8/2001 | Bhat | |
| 6,307,886 B1 * | 10/2001 | Westermann | H04N 19/51 375/240.09 |
| 6,377,548 B1 | 4/2002 | Chuah | |
| 7,027,414 B2 | 4/2006 | Walsh et al. | |
| 7,035,435 B2 | 4/2006 | Li et al. | |
| 7,158,481 B1 | 1/2007 | Saari | |
| 7,493,017 B2 | 2/2009 | Adler et al. | |
| 7,672,371 B2 | 3/2010 | Gatepin | |
| 7,797,633 B2 | 9/2010 | Flick et al. | |
| 8,161,158 B2 | 4/2012 | Curcio et al. | |
| 8,351,331 B2 | 1/2013 | Karagiannis | |

(Continued)

FOREIGN PATENT DOCUMENTS

| | | |
|---|---|---|
| EP | 2530885 | 12/2012 |
| WO | WO2013/188137 | 12/2013 |
| WO | WO2014/116449 | 7/2014 |

OTHER PUBLICATIONS

Junchen Jian, Vyas Sekar Hui Zhang, Improving Fairness, Efficiency, and Stability in HTTP-based Adaptive Video Streaming, Jun. 14, 2012, School of Computer Science Carnegie Mellon University p. 1-29.*
Merriam-Webster, Randomize definition, May 13, 2015, pp. 1-3.*
Merriam-Webster, Random definition, May 13, 2015, pp. 1-5.*
ISO/IEC 23009-1: Dynamic Adaptive Streaming Over HTTP (DASH)—Part 1: Media presentation description and segment formats, International Standard, Apr. 1, 2012; 134 pages http://standards.iso.org/ittf/license.html.

(Continued)

*Primary Examiner* — Anthony Mejia
*Assistant Examiner* — Joseph M Cousins
(74) *Attorney, Agent, or Firm* — Patent Capital Group

(57) ABSTRACT

A method is provided in one example embodiment and includes receiving video data at an adaptive bitrate (ABR) client that includes a buffer; determining whether a buffer level for the buffer is below a target buffer level; applying a random delay for a fetch interval associated with requesting the video data; and requesting a next segment of the video data after the random delay. The random delay can provide for a plurality of fetch times to become decorrelated from each other.

18 Claims, 9 Drawing Sheets

(56) References Cited

U.S. PATENT DOCUMENTS

| | | | |
|---|---|---|---|
| 8,396,983 | B1 | 3/2013 | Inskip et al. |
| 8,489,704 | B1 | 7/2013 | Mendez |
| 8,561,116 | B2* | 10/2013 | Hasek .................. H04L 67/2823 725/91 |
| 8,843,656 | B2 | 9/2014 | Gahm et al. |
| 2002/0042833 | A1 | 4/2002 | Hendler et al. |
| 2002/0044528 | A1 | 4/2002 | Pogrebinsky et al. |
| 2003/0118208 | A1* | 6/2003 | Epstein ........................ 382/100 |
| 2003/0156650 | A1 | 8/2003 | Campisano et al. |
| 2003/0200175 | A1* | 10/2003 | Wang et al. ..................... 705/50 |
| 2004/0098748 | A1 | 5/2004 | Bo et al. |
| 2005/0025150 | A1 | 2/2005 | Helmy et al. |
| 2005/0117640 | A1* | 6/2005 | Han ........................ H04N 19/63 375/240.03 |
| 2005/0232148 | A1 | 10/2005 | Curcio et al. |
| 2006/0039381 | A1 | 2/2006 | Anschutz et al. |
| 2006/0143678 | A1 | 6/2006 | Chou et al. |
| 2006/0289273 | A1 | 12/2006 | Erol et al. |
| 2007/0039449 | A1 | 2/2007 | Redmann |
| 2007/0053446 | A1 | 3/2007 | Spilo |
| 2007/0073904 | A1 | 3/2007 | Leung |
| 2007/0165531 | A1 | 7/2007 | Labrador et al. |
| 2008/0101410 | A1 | 5/2008 | Barkley et al. |
| 2008/0133766 | A1 | 6/2008 | Luo |
| 2008/0175273 | A1* | 7/2008 | Johansson et al. ............. 370/473 |
| 2008/0192839 | A1 | 8/2008 | Gahm et al. |
| 2008/0259031 | A1 | 10/2008 | Yoshino |
| 2008/0285496 | A1* | 11/2008 | Fuchs et al. .................... 370/311 |
| 2008/0310316 | A1 | 12/2008 | Oran et al. |
| 2009/0013129 | A1 | 1/2009 | Bondurant |
| 2009/0019178 | A1* | 1/2009 | Melnyk et al. ................. 709/233 |
| 2009/0028192 | A1 | 1/2009 | Rieger |
| 2009/0041114 | A1* | 2/2009 | Clark .................. H04L 43/0829 375/240.01 |
| 2009/0055580 | A1 | 2/2009 | Moscibroda et al. |
| 2009/0190474 | A1 | 7/2009 | Gahm et al. |
| 2010/0053300 | A1* | 3/2010 | Einarsson et al. .......... 348/14.01 |
| 2010/0169459 | A1 | 7/2010 | Biderman |
| 2010/0198979 | A1 | 8/2010 | Pickens et al. |
| 2010/0226247 | A1 | 9/2010 | Plamondon |
| 2010/0254462 | A1 | 10/2010 | Friedrich et al. |
| 2010/0299552 | A1 | 11/2010 | Schlack et al. |
| 2011/0002236 | A1 | 1/2011 | Chen et al. |
| 2011/0066673 | A1 | 3/2011 | Outlaw |
| 2011/0082924 | A1 | 4/2011 | Gopalakrishnan |
| 2012/0004960 | A1 | 1/2012 | Ma et al. |
| 2012/0140633 | A1 | 6/2012 | Stanwood |
| 2012/0173746 | A1 | 7/2012 | Salinger et al. |
| 2012/0302343 | A1 | 11/2012 | Hurst et al. |
| 2012/0303833 | A1 | 11/2012 | Bao et al. |
| 2012/0327779 | A1 | 12/2012 | Gell et al. |
| 2013/0007263 | A1 | 1/2013 | Sorouchian et al. |
| 2013/0023281 | A1 | 1/2013 | Meredith et al. |
| 2013/0077675 | A1* | 3/2013 | Rosen .................... H04N 19/15 375/240.03 |
| 2013/0097309 | A1 | 4/2013 | Ma |
| 2013/0138828 | A1 | 5/2013 | Strasman et al. |
| 2013/0227158 | A1 | 8/2013 | Miller et al. |
| 2013/0286879 | A1 | 10/2013 | ElArabawy |
| 2013/0326024 | A1 | 12/2013 | Chen et al. |
| 2013/0332620 | A1 | 12/2013 | Gahm et al. |
| 2014/0119428 | A1 | 5/2014 | Catchpole et al. |
| 2014/0215085 | A1 | 7/2014 | Li et al. |
| 2014/0244798 | A1 | 8/2014 | Prabhu et al. |
| 2014/0281000 | A1 | 9/2014 | Dattagupta et al. |
| 2014/0281009 | A1 | 9/2014 | Moorthy |
| 2015/0052236 | A1 | 2/2015 | Friedrich et al. |

OTHER PUBLICATIONS

Liu, Chengao, et al., "Rate Adaptation for Adaptive HTTP Streaming," Feb. 23, 2011, XP055077396, Abstract, Section 1 and 2.

Liu, Chenghao, et al., "Rate Adaptation for Dynamic Adaptive Streaming Over HTTP in Content Distribution Network," Signal Processing: Image Communication, vol. 27, No. 4, Oct. 10, 2011, pp. 288-311, XP055070550, ISSN: 0923-5965, DOI: 10.1016/j.image.2011.10.001, Abstract, Sections 1-6, Figure 5.

PCT Sep. 12, 2013 International Search Report and Written Opinion from International Application No. PCT/US2013/043739.

Wikipedia, the free encyclopedia, "Adaptive bitrate streaming," [retrieved and printed from the Internet Jan. 25, 2013], 8 pages; http://en.wikipedia.org/w/index.php?title=Adaptive_bitrate_streaming&oldid=534684826.

USPTO Oct. 15, 2013 Non-Final Office Action from U.S. Appl. No. 13/494,633.

USPTO May 29, 2014 Notice of Allowance from U.S. Appl. No. 13/494,633.

Astuti, Davide, ""Packet Handling,"" Seminar on Transport of Multimedia Streams in Wireless Internet, Helsinki, Finland, Aug. 29, 2003, 10 pages http://marco.uminho.pt/disciplinas/ST/st0304/packethandling.pdf.

Houdaille, Remi, et al., "Shaping HTTP Adaptive Streams for a Better User Experience," MMSys'12 Proceedings of the 3rd Multimedia Systems Conference, Feb. 22, 2012, ISBN:978-1-45-031131-1, pp. 1-9.

Jiang, Junchen et al., "Improving fairness, efficiency, and stability in HTTP-based adaptive video streaming with FESTIVE," Emerging Networking Experiments and Technologies, Dec. 10, 2012, pp. 97-108.

PCT Apr. 25, 2014 International Search Report and Written Opinion from International Application No. PCT/US2014/00111853.

PCT May 15, 2014 International Search Report and Written Opinion from International Application No. PCT/US2014/0018657.

Tian, Guibin, et al., "Towards Agile and Smooth Video Adaptation in Dynamic HTTP Streaming," Emerging Networking Experiments and Technologies, ACM, Dec. 10, 2012, pp. 109-120.

Akhshabi, Saamer, et al., "An Experimental Evaluation of Rate-Adaptive Video Players over HTTP," Signal Processing: Image Communication Apr. 1, 2012, ISSN:0923-5965.

Akhshabi, Saamer, et al., "What Happens When HTTP Adaptive Streaming Players Compete for Bandwidth?", May 2, 2012, ISBN:978-1-45-031430-5.

Houdaille, Remi, et al., "Shaping HTTP Adaptive Streams for a Better User Experience," MMSys'12 Proceedings of the 3rd Multimedia Systems Conference, Feb. 22, 2012, ISBN:978-1-45-031131-1, Abstract Only.

USPTO Dec. 19, 2013 Non-Final Office Action from U.S. Appl. No. 13/489,786.

Wikipedia®, "Bufferbloat," [retrieved and printed from http://en.wikipedia.org/wiki/Bufferbloat on Jun. 12, 2012], 4 pages.

B.J. Villa, et al., Improving Perceived Fairness and QoE for Adaptive Video Streams, IARIA © 2012, ISBN 978-1-61208-186-1, 10 pages.

USPTO May 29, 2014 Final Office Action from U.S. Appl. No. 13/489,786.

USPTO Nov. 3, 2014 Non-Final Office Action from U.S. Appl. No. 13/489,786.

USPTO Jan. 14, 2015 Non-Final Office Action from U.S. Appl. No. 13/661,330.

USPTO Feb. 23, 2015 Non-Final Office Action from U.S. Appl. No. 13/750,223.

USPTO Jan. 13, 2015 Non-Final Office Action from U.S. Appl. No. 13/802,952.

PCT Dec. 16, 2014 International Preliminary Report on Patentability and Written Opinion from the International Searching Authority from International Application No. PCT/US2013/043739.

USPTO Apr. 28, 2015 Final Office Action from U.S. Appl. No. 13/661,330.

USPTO Sep. 11, 2015 Final Office Action from U.S. Appl. No. 13/750,223.

USPTO Jul. 10, 2015 Final Office Action from U.S. Appl. No. 13/802,952.

USPTO Sep. 16, 2015 Non-Final Office Action from U.S. Appl. No. 13/967,183.

PCT Jul. 28, 2015 International Preliminary Report on Patentability and Written Opinion from International Application No. PCT/US2014/0011185.

* cited by examiner

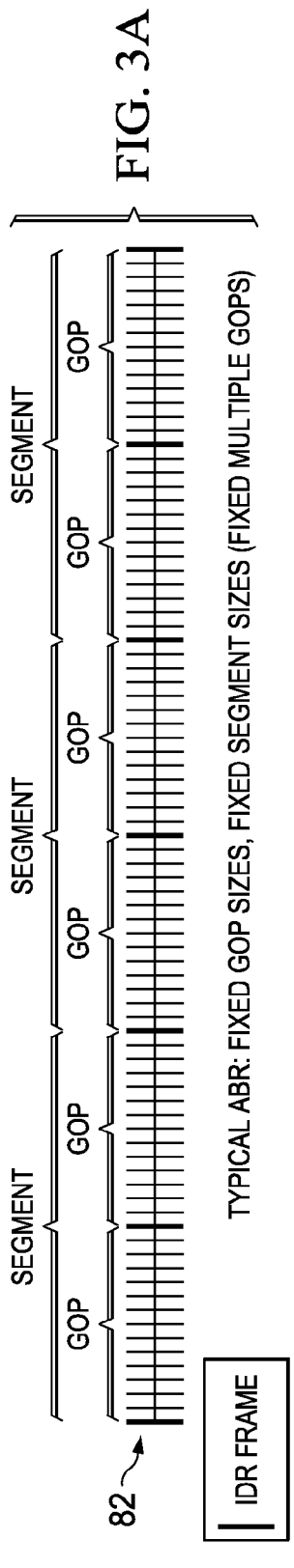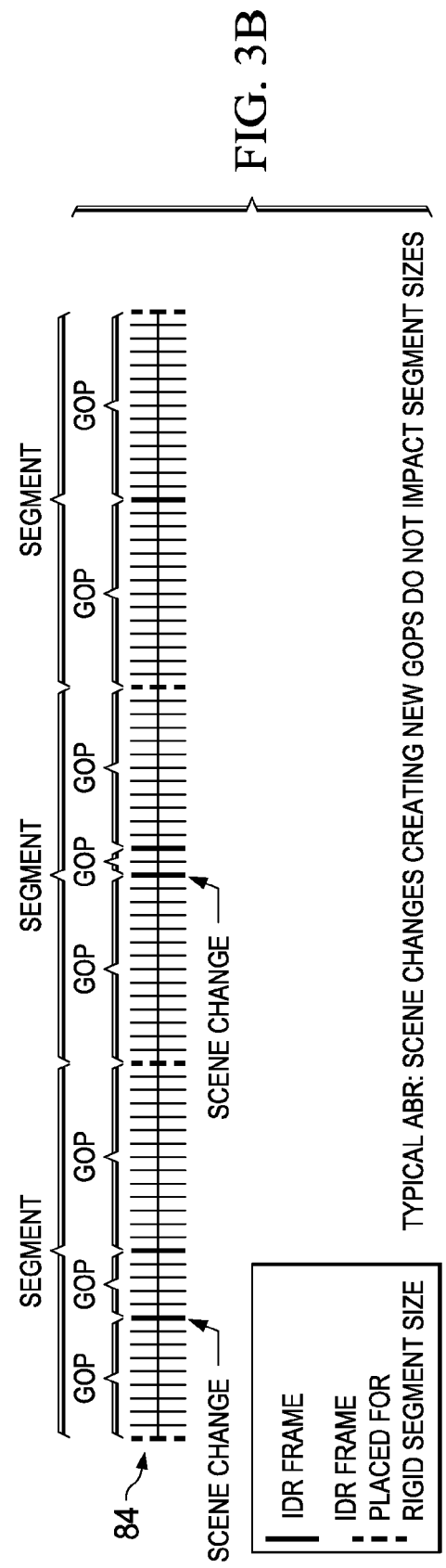

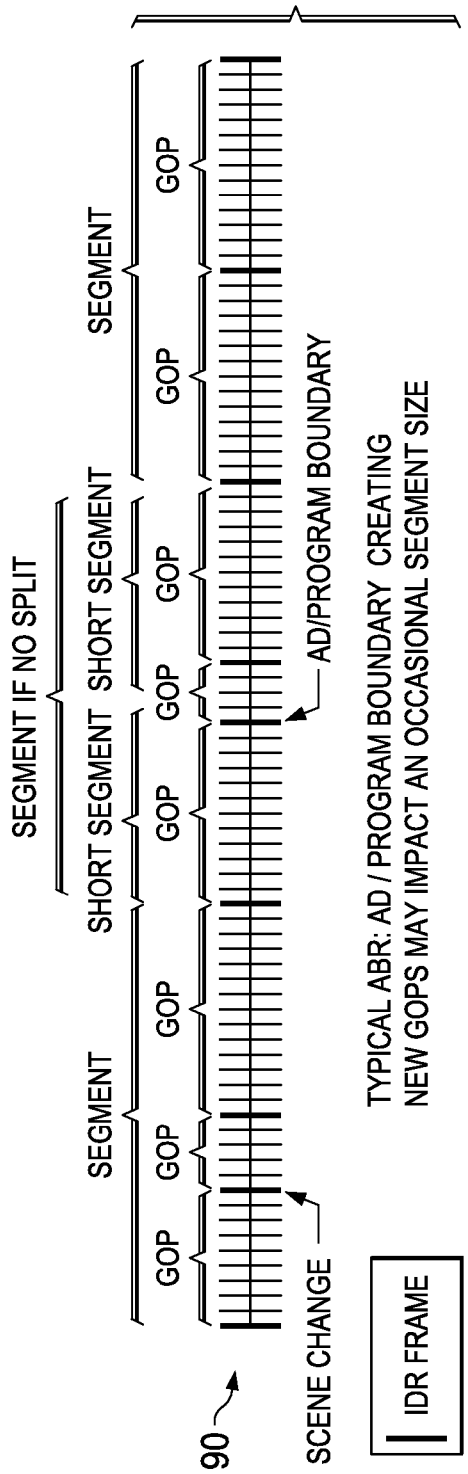
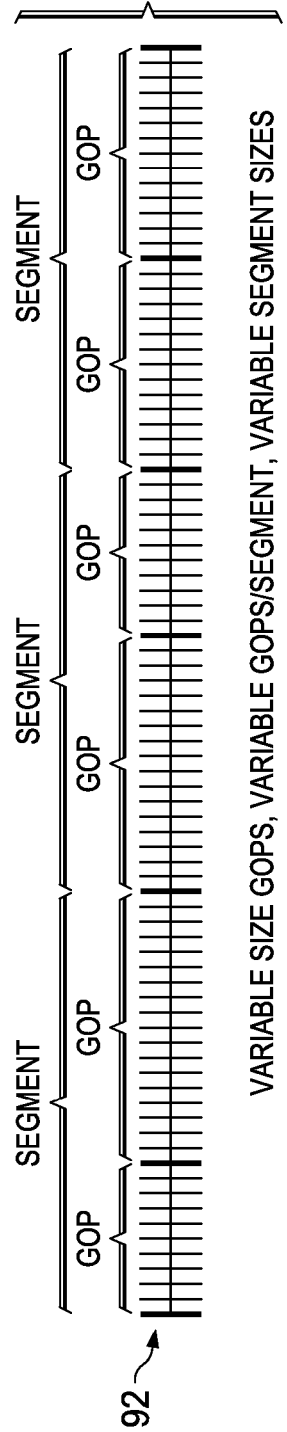
FIG. 3E
FIG. 3F

SYSTEM AND METHOD FOR PROVIDING RANDOMIZATION IN ADAPTIVE BITRATE STREAMING ENVIRONMENTS

TECHNICAL FIELD

This disclosure relates in general to the field of communications and, more particularly, to a system and a method for providing randomization in adaptive bitrate streaming environments.

BACKGROUND

End users have more media and communications choices than ever before. A number of prominent technological trends are currently afoot (e.g., more computing devices, more online video services, more Internet video traffic), and these trends are changing the media delivery landscape. Separately, these trends are pushing the limits of capacity and, further, degrading the performance of video, where such degradation creates frustration amongst end users, content providers, and service providers. In many instances, the video data sought for delivery is dropped, fragmented, delayed, or simply unavailable to certain end users.

Adaptive bitrate (ABR) is a technique used in streaming multimedia over computer networks. While in the past, most video streaming technologies utilized either file download, progressive file download, or custom streaming protocols, most of today's adaptive streaming technologies are based on hypertext transfer protocol (HTTP). These technologies are designed to work efficiently over large distributed HTTP networks such as the Internet.

ABR operates by detecting a user's bandwidth and CPU capacity and by adjusting the quality of a video stream accordingly. Typically, ABR leverages the use of an encoder that can encode a single source video at multiple bitrates. The player client can switch among the different encodings depending on available resources. Ideally, the result of these activities is little buffering, fast start times, and good experiences for both high-bandwidth and low-bandwidth connections. However, there are significant challenges that are presented when clients fall into repeating patterns, which engender competition that leads to problematic bandwidth scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3G are simplified schematic diagrams associated with various example frames and segment sizes;

DETAILED DESCRIPTION OF EXAMPLE EMBODIMENTS

Overview

A method is provided in one example embodiment and includes receiving video data at an adaptive bitrate (ABR) client that includes a buffer; determining whether a buffer level for the buffer is below a target buffer level; and applying a random delay for a fetch interval associated with requesting the media (e.g., video) data. The term 'random delay' encompasses any suitable timing characteristic, time interval, time period, pause, rest, waiting period, intermission, etc. that can be used in such a scenario. The method also includes requesting a next segment or partial-segment of the video data after the random delay. Note that the terms 'segment' and 'partial-segment' are reflective of any portion, piece, cut, slice, section, or part of the video data. The random delay can provide for a plurality of fetch times to become decorrelated from each other.

In more specific embodiments, the method can include determining whether additional jittering should be applied to the buffer level; and selecting a new target buffer level for the ABR client. The random delay can be based on a random number uniformly distributed between a first time interval and a second time interval, where the time intervals are based in seconds.

In a second approach to this embodiment, the method can include providing a random jitter for the target buffer level for the ABR client. The ABR client does not reach its steady-state mode as a result of the random jitter. The random jitter allows the ABR client to toggle between performing a subsequent fetch to fill up the buffer, and attempting to drain the buffer. The random jitter can be based, at least in part, on a particular format associated with the video data. The random jitter can also be based, at least in part, on a particular segment size associated with the video data.

In an entirely different embodiment of the present disclosure, a method can include randomly varying a target group of pictures (GOP) size for a next segment of video data to be received by an adaptive bitrate (ABR) client; determining whether the target GOP size has been met; and generating a new GOP based on the target GOP size. The target GOP size can be varied randomly during encoding and encapsulation processes. The target size can be determined, at least in part, based on previous segment sizes and a bitrate control characteristic.

Additionally, the generating of the new GOP can be influenced by GOP placement metadata. The target size can be varied by varying the number of frames of a particular GOP. In addition, the target size can be varied by varying a number of GOPs included within an ABR segment. The target size can be varied such that GOP boundaries are positioned at scene change points for certain encoding operations. In certain instances, an average number of frames in a GOP is large enough to account for encoding activities.

Example Embodiments

Figure 1A:
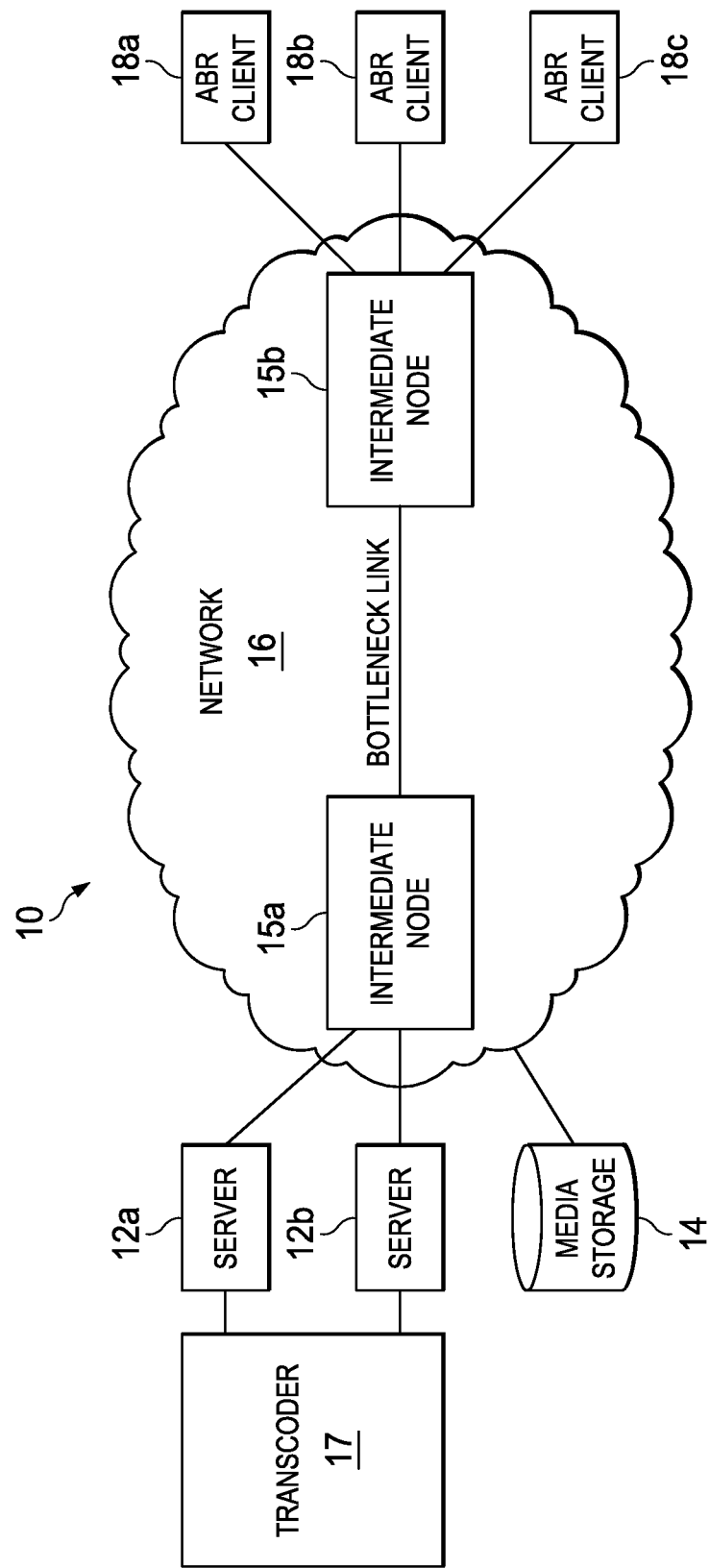
FIG. 1A is a simplified block diagram of a communication system for providing randomization in adaptive bitrate streaming environments in accordance with one embodiment of the present disclosure.

Turning to FIG. 1A, FIG. 1A is a simplified block diagram of a communication system 10 configured for providing randomization for adaptive bitrate (ABR) streaming clients in accordance with one embodiment of the present disclosure. Communication system 10 includes a plurality of servers 12a-b, a media storage 14, a network 16, a transcoder 17, a plurality of ABR clients 18a-c, and a plurality of intermediate nodes 15a-b. Servers 12a-b are configured to deliver requested content to ABR clients 18a-c. The content may include any suitable information and/or data that can propagate in the network (e.g., video, audio, media, any type of streaming information, etc.). Certain content may be stored in media storage 14, which can be located anywhere in the network. Media storage 14 may be a part of any web server, logically connected to one of servers 12a-b, suitably accessed using network 16, etc. In general, communication system 10 can be configured to provide downloading and streaming capabilities associated with various data services. Communication system 10 can also offer the ability to manage content for mixed-media offerings, which may combine video, audio, games, applications, channels, and programs into digital media bundles.

In accordance with the techniques of the present disclosure, the architecture of FIG. 1A can provide an ABR streaming client that significantly improves bandwidth performance in bottleneck scenarios. In particular, communication system 10 provides two techniques for breaking up repeating, rigid segment request patterns when multiple ABR clients compete with each other for bandwidth. The first technique can be implemented within the ABR client and involve jittering request times. The second technique can involve varying the size of ABR segments during the encoding and encapsulation process. In spite of the preexisting constraints on ABR GOP and segment sizes, there is still flexibility in picking GOP and segment sizes during the ABR encoding and encapsulation process. The thrust of the algorithm would be to use these remaining degrees of freedom to introduce randomness into the ABR segment sizes. Specific techniques can be used to randomize the sizes, while at the same time respecting the preexisting constraints on GOP and segment sizes. [Both of these techniques are further detailed below in conjunction with associated flowcharts.]

Note that by breaking up the repeating rigid segment request patterns, ABR clients would not be forced into disadvantaged (or advantaged) high-bitrate situations. Instead, a more fair distribution of the bottleneck link would be achieved amongst the competing ABR clients. Before detailing these activities in more explicit terms, it is important to understand some of the bandwidth challenges encountered in a network that includes ABR clients. The following foundational information may be viewed as a basis from which the present disclosure may be properly explained.

Adaptive streaming video systems make use of multi-rate video encoding and an elastic IP transport protocol suite (typically hypertext transfer protocol/transmission control protocol/Internet protocol (HTTP/TCP/IP), but could include other transports such as HTTP/SPDY/IP, etc.) to deliver high quality streaming video to a multitude of simultaneous users under widely varying network conditions. These systems are typically employed for "over-the-top" video services, which accommodate varying quality of service over network paths.

In adaptive streaming, the source video is encoded such that the same content is available for streaming at a number of different rates (this can be via either multi-rate coding, such as H.264 AVC, or layered coding, such as H.264 SVC). The video can be divided into "chunks" of a group-of-pictures (GOP) or more (e.g., typically two (2) to ten (10) seconds of length). ABR clients can access chunks stored on servers (or produced in near real-time for "live" streaming) using a Web paradigm (e.g., HTTP GET operations over a TCP/IP transport), and they depend on the reliability, congestion control, and flow control features of TCP/IP for data delivery. ABR clients can indirectly observe the performance of the streaming fetch operations by monitoring the delivery rate and/or the fill level of their buffers and, further, either upshift to a higher encoding rate to obtain better quality when bandwidth is available, or downshift in order to avoid buffer under-runs and the consequent video stalls when available bandwidth decreases, or stay at the same rate if available bandwidth does not change. Compared to inelastic systems such as classic cable TV or broadcast services, adaptive streaming systems use significantly larger amounts of buffering to absorb the effects of varying bandwidth from the network.

In a typical scenario, ABR streaming clients would fetch content from a network server in segments. Each segment can contain a portion of a program, typically comprising a few seconds of program content. [Note that the term 'segment' and 'chunk' are used interchangeably herein in this disclosure.] For each portion of the program, there are different segments available with higher and lower encoding bitrates: segments at the higher encoding rates require more storage and more transmission bandwidth than the segments at the lower encoding rates. ABR clients adapt to changing network conditions by selecting higher or lower encoding rates for each segment requested, requesting segments from the higher encoding rates when more network bandwidth is available (and/or the client buffer is close to full), and requesting segments from the lower encoding rates when less network bandwidth is available (and/or the client buffer is close to empty).

With most ABR technologies, it is common practice to have every segment represent the same, or very nearly the same, interval of program time. For example, in the case of MICROSOFT Smooth streaming, it is common practice to have every segment (referred to in Smooth as a 'fragment') of a program represent almost exactly 2 seconds worth of content for the program. With APPLE HTTP Live Streaming (HLS), it is quite common practice to have every segment of a program represent almost exactly 10 seconds worth of content. Although it is also possible to encode segments with different durations (e.g., using 6-second segments for APPLE HLS instead of 10-second segments), even when this is done, it is nevertheless common practice to keep all segments within a program to the same duration. Hence, even if an APPLE HLS program were encoding with 6-second segments, rather than 10-second segments, one would normally find all segments from that program having almost exactly a 6-second duration instead of, for example, certain segments representing a 4-second duration, and others representing a 7-second duration within the same program.

Another common feature of ABR technologies is that they tend to have a buffering mode and a steady-state mode. For example, when in a buffering mode, a client typically fetches chunks of ABR content as rapidly as possible, beginning the fetch of the next chunk as soon as the download of the current chunk has completed. When a client is operating in the buffering mode, it uses as much network bandwidth as it can obtain, as it tries to fill its buffer as rapidly as possible. Once an ABR client's buffer has filled to some target level, the ABR client switches to a steady-state mode.

When in the steady-state mode, the ABR client can fetch content only as fast as it is being consumed by its decoder; otherwise its buffer would grow without bound. For example, if the ABR content has been encoded as 2-second chunks, then when in steady-state mode, the ABR client can fetch a new chunk on average no more frequently than every 2 seconds. When a client is in the steady-state mode, it does not use more bandwidth than the nominal playout rate of the content it is downloading, even if more bandwidth is available on the link.

Hence, when operating in a buffering mode, the ABR client fetches segments back-to-back as rapidly as possible, with the request for the next segment being issued as soon as the previous request has completed. ABR clients commonly use this mode when they are trying to build up a buffer of segments ahead of the current playout point in order to provide a safety margin to prevent a buffer underrun (e.g., in case the next segment arrives more slowly than expected). When in steady-state mode, clients typically fetch the next segment of the program only after removing and displaying a previously downloaded segment from the buffer. A client typically uses this steady-state mode once its buffer is full. By waiting until a segment has been removed from the buffer before requesting another segment from the server, the client keeps its segment buffer from growing to unreasonable sizes in conditions where segments could be downloaded faster than the nominal playout rate.

When clients are in steady-state mode and segment durations are constant throughout a program, each client can exhibit an almost metronomic regularity in its pattern of requests to fetch segments. For example, if a smooth client is in its steady-state mode, and assuming that the program is encoded with all segments having almost exactly 2-second durations, then the client would typically request a new segment almost exactly every 2 seconds. When several ABR clients are competing for bandwidth at a bottleneck link in the network, the ABR clients often become virtually locked into a repeating (and sometimes unfair) allocation of bandwidth on the link. This is the result of the aforementioned metronomic, repeating fetch pattern shared by the ABR clients once they have reached their steady state.

Consider an example in which there are 4 ABR clients sharing a 10 Mbps bottleneck link, each fetching a segment every 2 seconds. Client A begins its fetch at time 0 (and at time 2, time 4, etc.) and ends at time 2. Clients B, C, and D all begin their fetches at time 0.5 seconds and end at time 2. Assume that all clients exactly fair-share the link during the times when they are actively fetching the segment. From time 0 to time 0.5 seconds, client A has the link all to itself. From time 0.5 to time 2 seconds, the link bandwidth is split 4 ways amongst the 4 ABR clients.

During the first 0.5 seconds, client A can download 5 Mbit worth of data. During the subsequent 1.5 seconds, client A will download 3.75 Mbit worth of data (2.5 Mbps for 1.5 seconds). Thus, client A will have downloaded 8.75 Mbit worth of data during the full 2-second interval. Assuming that there is an encoding bitrate of 4.375 Mbps available for the program, client A may choose an adaptation rate of 4.375 Mbps and remain at that rate. Clients B, C, and D each download at ¼ of the link bandwidth (2.5 Mbps) for 1.5 seconds, for a total of 3.75 Mbit downloaded during the 2-second interval. Each of these clients will calculate the apparent available bandwidth at 3.75 Mbit/1.5 sec, or 2.5 Mbps. Assuming that there is a rate of 2.5 Mbps available for the program, clients B, C, and D may settle permanently at this rate. In this example, ABR clients A, B, C, and D may remain in near-permanent equilibrium, with client A having selected a rate of 4.375 Mbps and clients B, C, and D having selected a rate of 2.5 Mbps.

Although the above example has been intentionally simplified (e.g., ignoring TCP dynamics amongst other things), actual experiments have shown situations where populations of real clients become locked into unfair patterns. In some cases, populations of APPLE HLS clients have been observed with some clients stuck at rates almost a factor of 3 lower than the more fortunate clients in the population.

Hence, a problem exists when ABR clients are collectively in a steady-state mode together. They fall into repeating patterns in which they request a new segment during a specified segment duration. The nature of ABR formats is that they tend to have rigid, consistent segment sizes (e.g., every 2 seconds). Repeating patterns often lead to clients synchronizing with each other over time (rather than dispersing). These rigid repeating patterns can lead to certain clients being advantaged or disadvantaged over their peers, which results in certain ABR clients receiving unfair portions of bandwidth.

Consequently, one issue to be resolved in these scenarios is to identify ways to break up the regular, repeating fetch and download pattern that can emerge amongst ABR clients in a population. Any proposed solution should introduce enough randomness (or other variations) into the system such that no ABR client becomes permanently stuck at an unfairly advantaged or disadvantaged position relative to other ABR clients. Furthermore, all ABR clients, over a reasonably small number of fetch operations, would see approximately equal available bandwidth at the bottleneck link where they would be competing.

Communication system 10 can address these issues (as well as potentially others) by offering an ABR client configuration that effectively manages the steady-state patterns. There are two techniques that can be implemented by the architecture of communication system 10 to address these issues. The first technique includes two different approaches for accomplishing its objective. For example, the first approach can include adding a random term to the fetch time for retrieving each segment. This would allow (over time) the fetch times to become decorrelated from each other. In a second approach of the first technique (rather than directly randomizing the fetch time), a random jitter can be set for a desired target level of the client's buffer. The ABR clients would therefore not reach their steady-state mode, and this effectively avoids the aforementioned patterns.

The steady-state mode would typically occur when the client had filled up its buffer to a desired level. In this second approach, the desired level would continuously be changed such that the ABR client is systematically toggling between performing a subsequent fetch to fill up the buffer, and attempting to drain the buffer of data (in which case the ABR client would wait longer to request more data). Hence, the randomization can occur in the first technique via two different ways: 1) randomizing the time for initiating the fetch request; and/or 2) dynamically randomizing the buffer level requirement (which would have the effect of randomizing the fetch request).

Consider an example scenario in which an ABR client is in steady state. Instead of requesting a new segment each time a segment is removed from the buffer, the ABR client applies a randomized jitter to the request time for the next segment. For example, each time a segment representing N seconds worth of content is removed from the client's buffer in order to be displayed, the client would pick a random number (e.g., uniformly distributed between 0 seconds and 2*N seconds) at which to request the next segment. The exact magnitude of the jitter applied in this way and the distribution (uniform or otherwise) may be managed for the particular ABR client (e.g., involving different ABR formats, segment sizes, etc.), or could be configurable by the user, an administrator, a service provider, etc.

The other paradigm that is helpful in decorrelating the request times (when changes to the ABR client are possible) is to vary the target size of the client's buffer randomly. This technique might be particularly helpful when clients are playing live content because all clients playing a particular live stream would normally fetch the same segments at approximately the same time, regardless of what time the clients begin their playout. Before turning to the example flows of the present disclosure, a brief overview of the internal structure of an example ABR client and an example transcoder is provided via FIGS. 1B-1C.

Figure 1B:
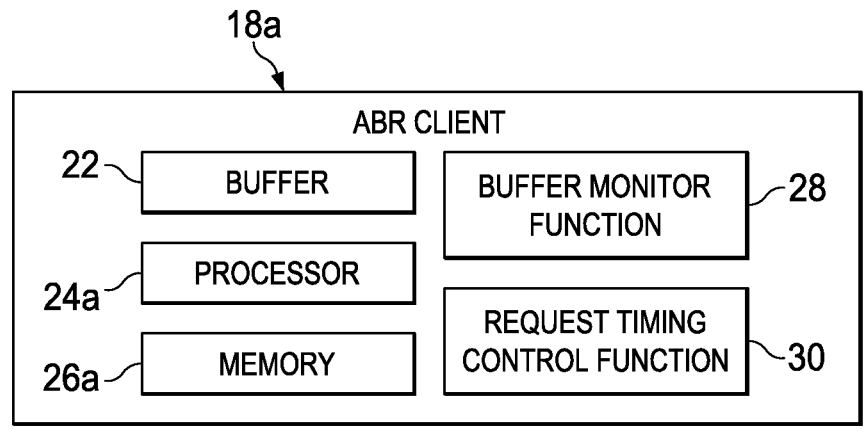
FIG. 1B is a simplified block diagram illustrating possible example details associated with one embodiment of the present disclosure.

Turning to FIG. 1B, FIG. 1B is a simplified block diagram illustrating one possible set of details associated with communication system 10. This particular configuration includes ABR client 18a being provisioned with a buffer 22, a processor 24a, a memory 26a, a buffer monitor function 28, and a request timing control function 30. Buffer 22 can be configured to buffer content received at a receiver (e.g., ABR client 18a). Buffer monitor function 28 can be configured to monitor buffer 22 and determine a status of buffer 22. Request timing control function 30 can be configured to monitor the state of the content stream that the receiver (e.g., ABR client 18a) is receiving and determine when to apply a randomized jitter to the request time for the next segment.

Figure 1C:
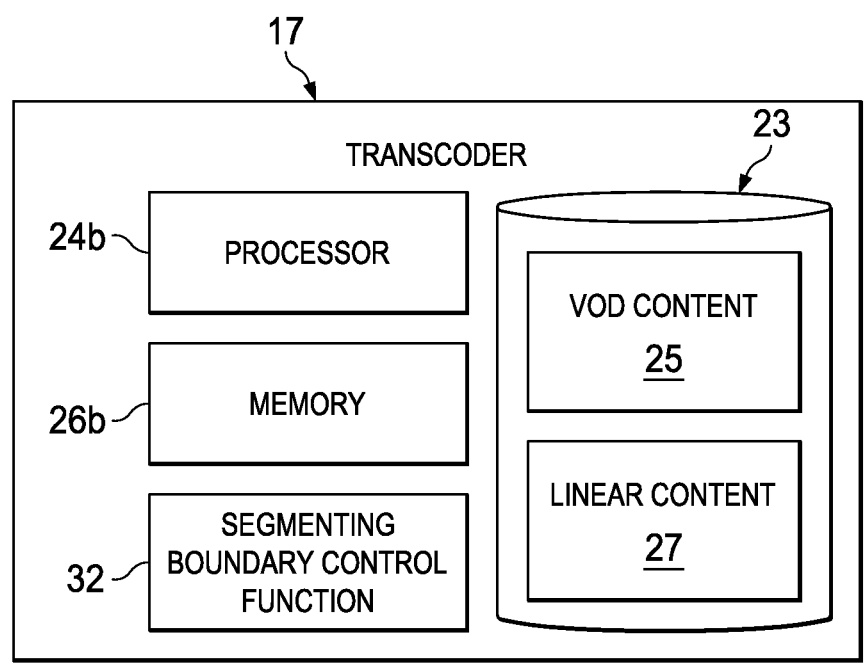
FIG. 1C is another simplified block diagram illustrating possible example details associated with one embodiment of the present disclosure.

Turning to FIG. 1C, FIG. 1C is a simplified block diagram illustrating one possible set of details associated with a given transcoder 17. This particular configuration includes transcoder 17, which may include a processor 24b, a memory 26b, a segmenting boundary control function 32, and a storage element 23 for video on demand (VOD) content 25, for linear content 27, or for any other suitable content. In one particular example, transcoder 17 can be configured to introduce randomness by varying the segment durations during the encoding/encapsulation process. [Note that a full discussion of the capabilities of transcoder 17 is provided below in conjunction with associated FIGURES.] One alternative embodiment of the present disclosure can involve a two-part solution in which transcoder 17 and ABR client 18a are operating in concert to achieve the techniques of the present disclosure. This could involve, for example, instances of segmenting boundary control function 32 and/or buffer monitor function 28 being used. Alternatively, simple messaging or signaling can be exchanged between an ABR client and other network elements in order to carry out the activities discussed herein. In this sense, some of the randomization operations and responsibilities can be performed at various locations in the network and/or shared amongst several devices.

Figure 2:
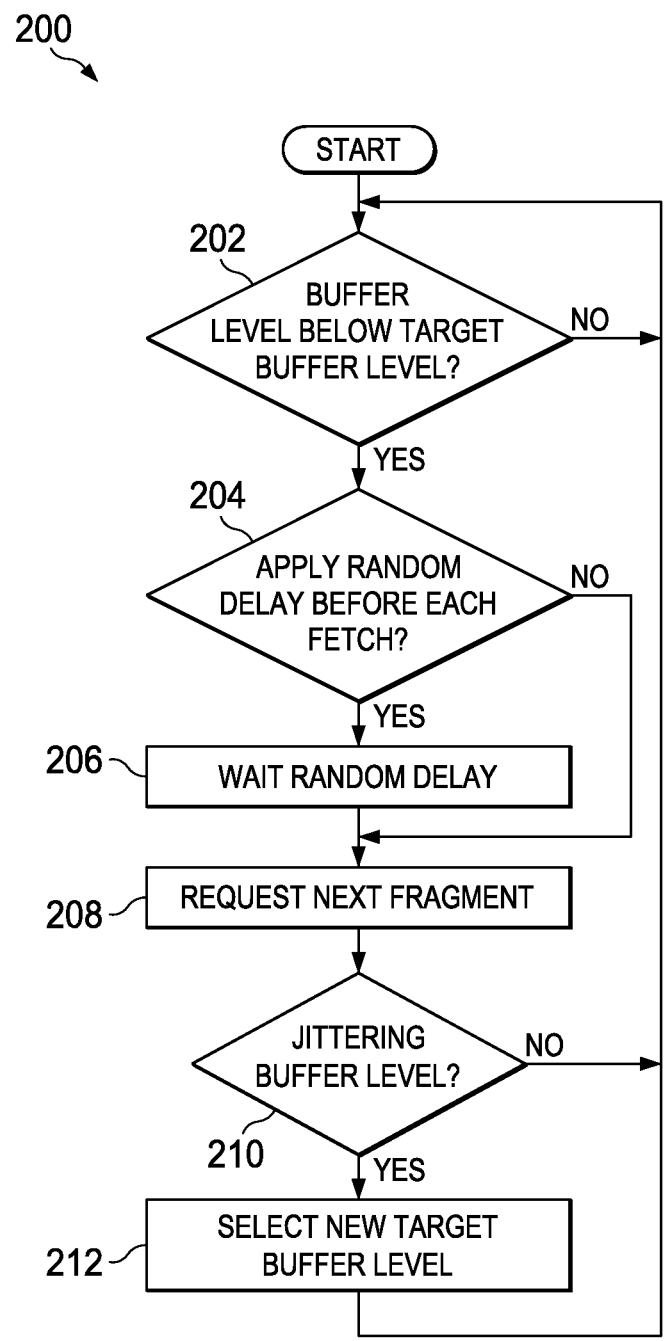
FIG. 2 is a simplified flowchart illustrating potential operations associated with the communication system in accordance with one embodiment of the present disclosure.

Turning to FIG. 2, FIG. 2 is a simplified flowchart illustrating potential operations 200 associated with the first technique of the present disclosure. This particular flow may begin at 202, where a determination is made whether the buffer level is below a target buffer level. At 204, a random delay is applied before each fetch interval. At 206, the system waits for a random delay. At 208, a next segment is requested. At 210, a determination is made for additional jittering for the buffer level. At 212, a new target buffer level is selected and the process continues.

Figure 3C:
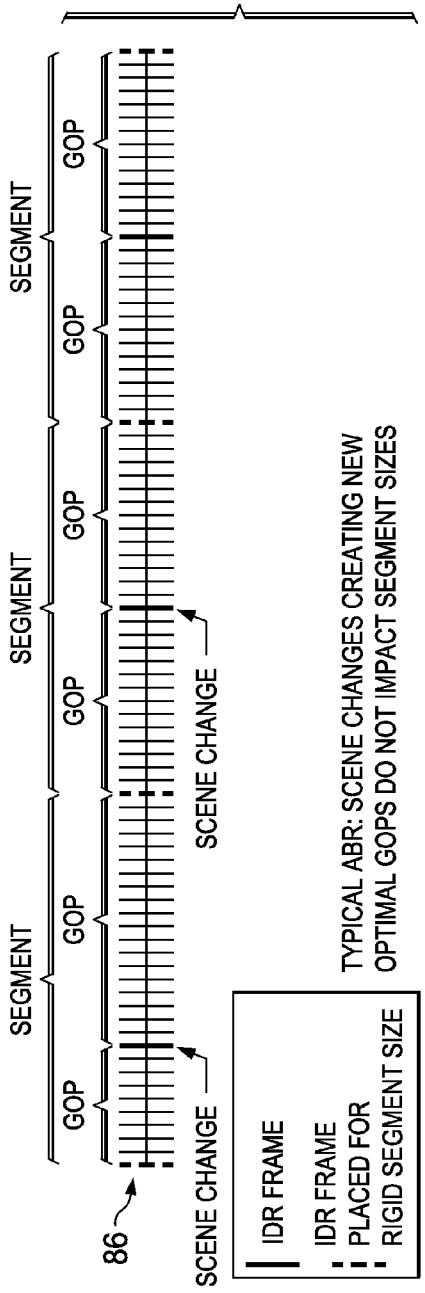
Figure 3D:
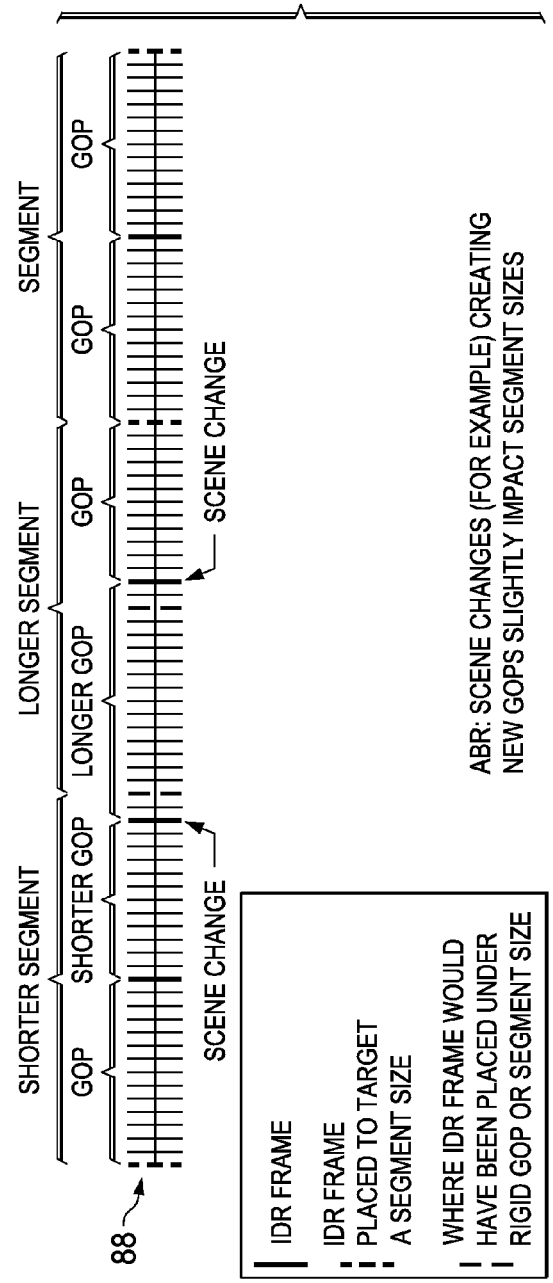

Turning to FIGS. 3A-3E, FIGS. 3A-3E are offered to further illustrate and explain some of the common segment sizes and problematic issues encountered in ABR technologies. These simplified schematic diagrams reflect typical environments and activities associated with the present disclosure. In the case of FIG. 3A, a number of frames are illustrated generally at 82. With most ABR technologies, it is common practice to have every segment represent the same (or very nearly the same) interval of program time. Segments are composed of one or more GOPs. Normally, encoders are configured to have a GOP of a given size (number of frames). Thus, it is typical for a segment to be composed of the same number of GOPs. There is a separate requirement that segments encoding at different bitrates (but representing the same portion of a program) should have the same duration, since otherwise it would not be possible to seamlessly switch from one encoding rate to another. However, common practice generally goes beyond this basic requirement of the technology and has all segments be the same size, even for segments representing different portions of the program.

However, various factors can influence the decision to start a new GOP. A scene change is one such factor. Yet even with the presence of GOPs due to scene changes, it is still a common practice to generate ABR segments of the same size. As shown generally by arrows 84 and 86 of FIGS. 3B-3C, new GOPs are forced at specific frame intervals to produce segments of equal duration. The forced placement of a new GOP to produce segments of equal duration can have quality impacts, especially if the Instantaneous Decoder Refresh (IDR) frame created for the new GOP was in close proximity to another IDR frame.

Uncommonly practiced in ABR is the notion of permitting slight variations to segment durations to address such quality concerns. As shown generally by arrow 88 of FIG. 3D, segment sizes are still nominally the same size. Occasionally, for advertising or program delineation purposes, a segment will be split at the boundary point as shown generally at 90 of FIG. 3E. While this does produce variability in the segment sizes, the occurrence is often only a few times per hour.

Figure 3G:
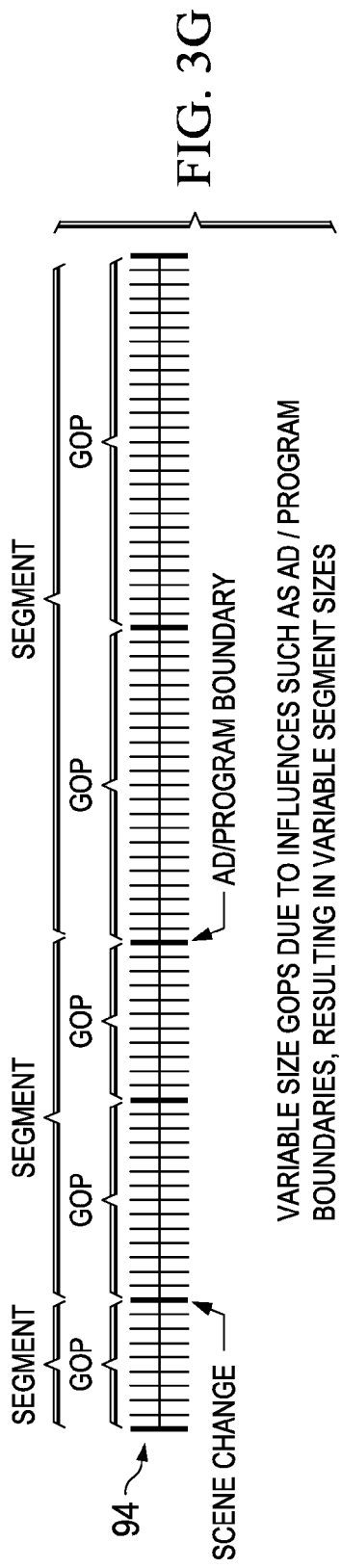

The second technique of the present disclosure involves adding a randomization factor into the decision process that generates GOP sizes, as well as addressing how many of the GOPs should be grouped within a given segment. As shown generally at arrows 92 and 94 of FIGS. 3F-3G, GOPs sizes are optimized, considering factors such as scene changes and program delineations. However, additional variability is added to the GOP sizes and to the combining of GOPs into segments to yield larger variations in segment-to-segment sizes.

Figure 3H:
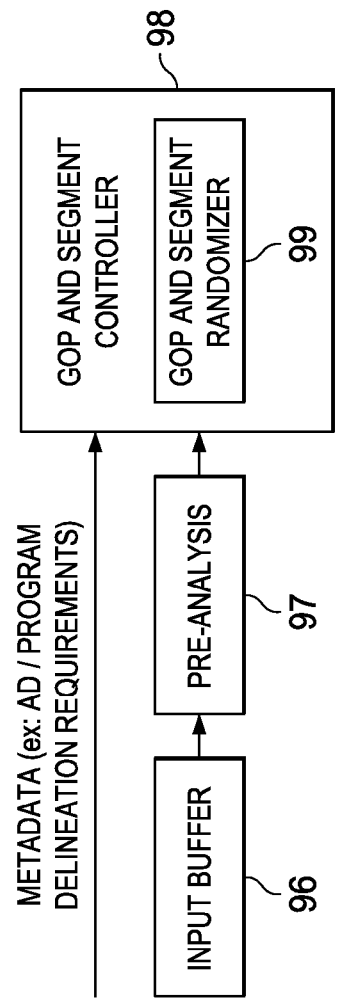
FIG. 3H is a simplified block diagram illustrating one potential example associated with a segment controller.

FIG. 3H is a simplified block diagram illustrating one potential example configuration 95 associated with a segment controller, which could be provided within transcoder 17. More specifically, FIG. 3H includes an input buffer 96, a component associated with a pre-analysis 97, and a GOP and segment randomizer 99, which is provisioned in an example GOP and segment controller 98. An ABR encoder may have common processing tasks influencing GOPs decisions such as lookahead/pre-analysis. The decisions on the creation of new GOPs and which GOPs are to be placed into a segment can be done via GOP and segment controller 98. This configuration of FIG. 3H essentially adds GOP and segment randomizer 99, which intelligently randomizes both GOP and segment sizes, dynamically taking into consideration existing encoder decisions desiring GOP placement.

Figure 3I:
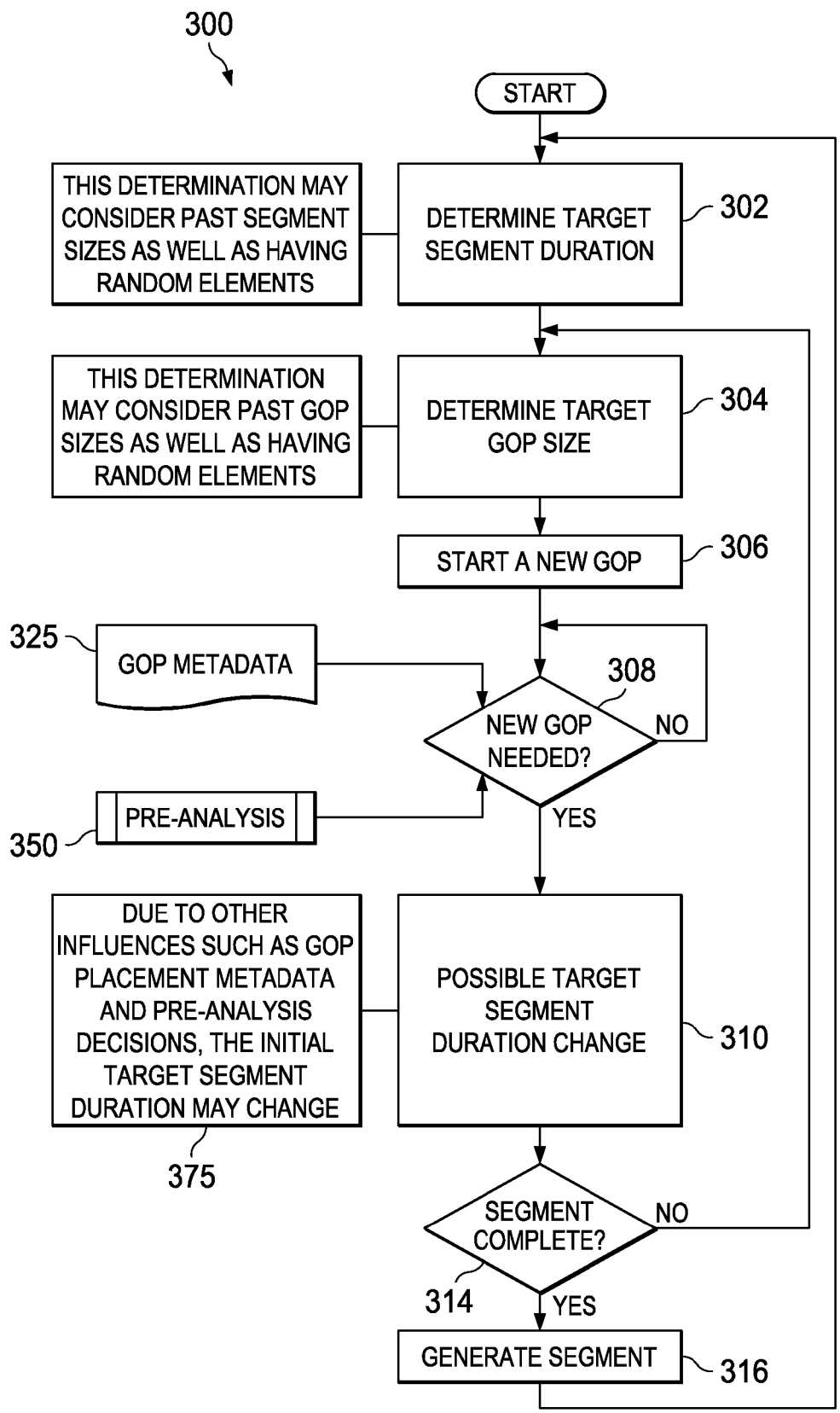
FIG. 3I is a simplified flowchart illustrating potential operations associated with the communication system in accordance with one embodiment of the present disclosure.

FIG. 3I is a simplified flowchart illustrating potential operations 300 associated with the second technique of communication system 10. In regards to the second technique, it should be appreciated that the nature of certain technologies (e.g., video on demand (VOD)) is such that any number of clients could be watching different content at different points (e.g., at the one-hour mark, at the two-hour mark, etc.). If all the segments were still being fetched every two seconds, steady state would be reached. However, using the architecture of FIG. 1A, if the segment size durations themselves are randomized (e.g., instead of every two seconds, using every half second, every one second, etc.), the fetch patterns across the ABR clients would be randomized. This segment size randomization could be performed by transcoder 17 in certain example implementations of the present disclosure. For linear content, the segment sizes could be randomized, along with any one of the enhancements of the first solution (e.g., randomize the buffer size).

In this embodiment, randomness is being introduced into the system by varying the segment durations for the ABR content during the ABR encoding/encapsulation process. This can be accomplished, for example, by varying the number of frames within a GOP during the encoding process and/or by varying the number of GOPs included within an ABR segment. (In general, an ABR segment should consist of one or more complete GOPs.) By varying both the number of frames within a GOP, and the number of GOPs within an ABR chunk, it is possible to create ABR segments representing a smoothly distributed range of program time durations. If GOP size were fixed and only the number of GOPs within a segment could vary, then ABR segments could have only a few different sizes, and rigid synchronization patterns would most likely emerge amongst ABR clients based on the GOP duration, rather than the segment duration, since the fixed GOP duration would then be a sub-multiple of all the segment durations.

If GOP size could vary, but the number of GOPs within a segment were fixed, then the ABR segment sizes might not vary over a wide enough range. (Note that if GOP size could vary over a wide enough range, then it is possible that simply varying the GOP size with one GOP for a segment could provide sufficient variation in segment sizes. However because there are often other constraints on GOP size, the architecture the present disclosure permits varying both GOP size and the number of GOPs per segment.)

Turning to the example flow of FIG. 3I, initially a target size for the next segment is computed at 302. This may consider previous segment sizes and have random elements influencing the decision. Given a target segment size, a target GOP size can be determined at 304. This determination may also consider previous GOP sizes, rate control needs, and/or have other random elements influencing the decision, etc. A new GOP is then started with the target GOP size envisioned, as shown at 306. However, other influences, such as pre-analysis (shown generally at 350) and GOP placement metadata (shown generally at 325) such as Ad or Program delineation issues may dynamically influence the need to start a new GOP (shown generally at 375). Therefore, once a new GOP is needed (shown generally at 308), the target segment size is re-evaluated and potentially changed (shown generally at 310). Once the target segment size is set, a determination is made if the segment size has been met. If not, the system continues by calculating the next GOP size. If the segment size has been met, the segment is considered complete (shown generally at 314). The segment is generated and the process repeats, as reflected by 316.

Thus, the ABR encoding and encapsulation process imposes other constraints on GOP and ABR segment size and, therefore, the algorithm for choosing the GOP sizes and segment sizes would respect these other constraints, as well as the requirement for randomness that is discussed herein. Specifically, GOP sizes are typically constrained during the encoding process such that: (i) an average number of frames in a GOP should be large enough to permit efficient encoding; (ii) a number of frames in a GOP should not be so large as to force large segment sizes, or to prevent splices with sufficient granularity; and (iii) GOP boundaries are positioned at scene change points for best encoding efficiency (as discussed above). Similarly, ABR segment sizes should be chosen to balance the required fetch time by the ABR client against the need to allow the client to switch rates with reasonable granularity if network congestion conditions should change. In addition, in live delivery scenarios, larger segment sizes may simply not be available to use.

Turning to the example infrastructure associated with the present disclosure, ABR clients 18a-c can be associated with devices, customers, or end users wishing to receive data or content in communication system 10 via some network. The term 'ABR client' is inclusive of devices used to initiate a communication, such as any type of receiver, a computer, a set-top box, an Internet radio device (IRD), a cell phone, a smart phone, a tablet, a personal digital assistant (PDA), a GOOGLE DROID, an IPHONE, and IPAD, or any other device, component, element, endpoint, or object capable of initiating voice, audio, video, media, or data exchanges within communication system 10. ABR clients 18a-c may also be inclusive of a suitable interface to the human user, such as a display, a keyboard, a touchpad, a remote control, or any other terminal equipment. ABR clients 18a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, audio, or script data, or any type of source or object code, or any other suitable information in any appropriate format that may be communicated from one point to another.

Transcoder 17 is a network element configured for performing one or more encoding operations. For example, transcoder 17 can be configured to perform direct digital-to-digital data conversion of one encoding to another (e.g., such as for movie data files or audio files). This is typically done in cases where a target device (or workflow) does not support the format, or has a limited storage capacity that requires a reduced file size. In other cases, transcoder 17 is configured to convert incompatible or obsolete data to a better-supported or more modern format.

Network 16 represents a series of points or nodes of interconnected communication paths for receiving and transmitting packets of information that propagate through communication system 10. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber-to-the-x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

In more general terms, ABR clients 18a-c, transcoder 17, and servers 12a-b are network elements that can facilitate the randomization activities discussed herein. As used herein in this Specification, the term 'network element' is meant to encompass any of the aforementioned elements, as well as routers, switches, cable boxes, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, ABR clients 18a-c, transcoder 17 and/or servers 12a-b include software to achieve (or to foster) the randomization activities discussed herein. This could include the implementation of instances of buffer monitor function 28, request timing control function 30, and/or segmenting boundary control function 32. Additionally, each of these elements can have an internal structure (e.g., a processor, a memory element, etc.) to facilitate some of the operations described herein. In other embodiments, these randomization activities may be executed externally to these elements, or included in some other network element to achieve the intended functionality. Alternatively, ABR clients 18a-c, transcoder 17, and servers 12a-b may include software (or reciprocating software) that can coordinate with other network elements in order to achieve the randomization activities described herein. In still other embodiments, one or several devices may include any suitable algorithms, hardware, software, components, modules, interfaces, or objects that facilitate the operations thereof.

As used herein, the 'fetch interval' can include any suitable timing parameter associated with retrieving content (or, at least portions thereof). In one example, the fetch interval is being randomized based on an algorithm. In other scenarios, the fetch interval can be performed dynamically (e.g., in real-time), which may or may not involve feedback associated with a particular time interval.

Figure 4:
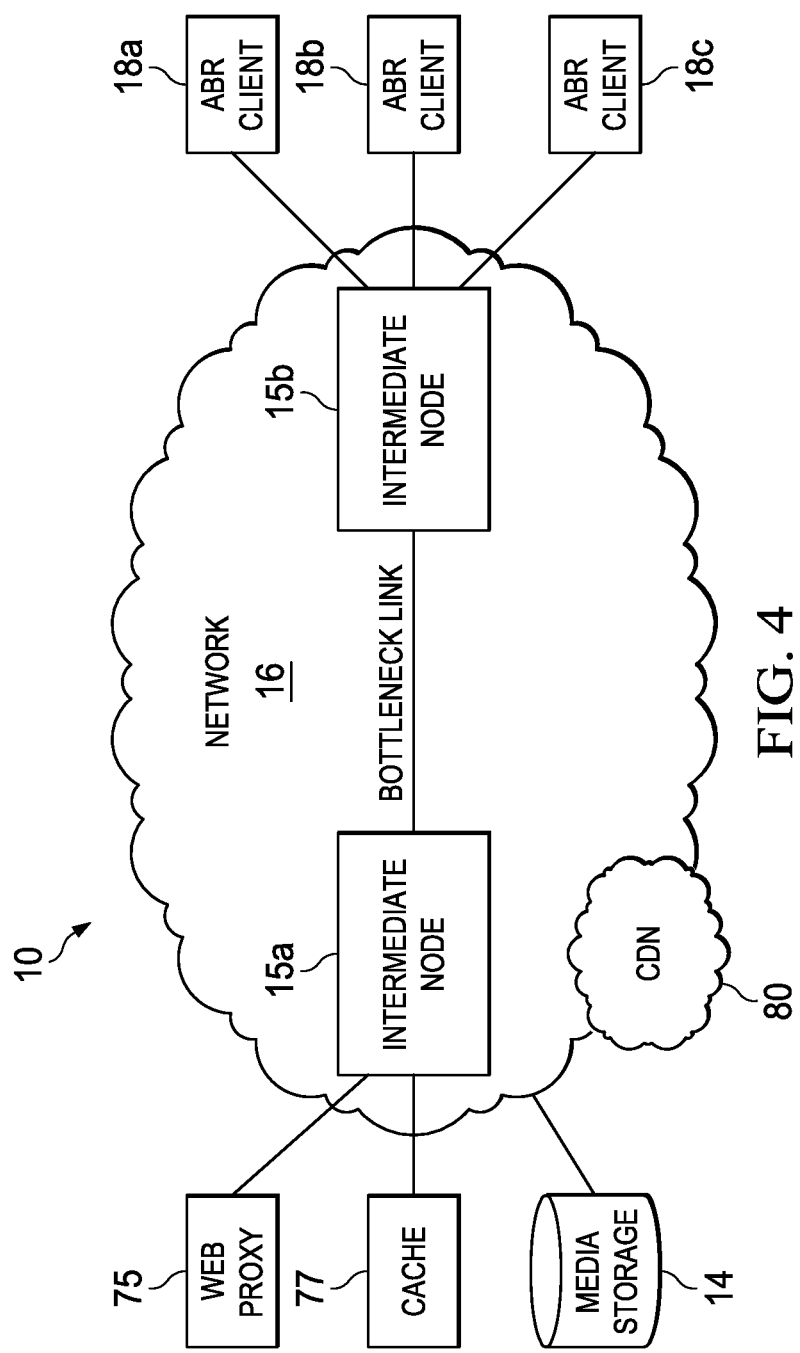
FIG. 4 is a simplified block diagram illustrating an alternative embodiment associated with the communication system.

FIG. 4 is a simplified block diagram illustrating an alternative embodiment associated with the present disclosure. In an alternative implementation, a cache 77, a web proxy 75, and/or a content delivery network (CDN) 80 can be provisioned in the middle (or at the edge) of a network and, further, operate in conjunction with the present disclosure. Additionally, these elements can be provided on either side of the bottleneck depicted in FIG. 4. The ABR client itself can be embedded in any of these elements (cache 77, web proxy 75, CDN 80). In certain embodiments, any of these elements can be instructed to provide the randomization features discussed herein. Hence, suitable randomization functions could be embedded in any of the network elements illustrated in FIG. 4. For example, a response time could be randomized by a given network node based on feedback provided by the ABR client.

Hence, the randomization techniques of the present disclosure can be provisioned as part of a proxy server, web proxy, cache, CDN, etc. This could involve, for example, instances of segmenting boundary control function 32 and/or buffer monitor function 28 being provisioned in these elements. Alternatively, simple messaging or signaling can be exchanged between an ABR client and these elements in order to carry out the activities discussed herein. In this sense, some of the randomization operations can be shared amongst these devices.

In operation, CDN 80 can provide bandwidth-efficient delivery of content to ABR clients 18a-c or other endpoints, including set-top boxes, personal computers, game consoles, smartphones, tablet devices, IPADs, IPHONEs, GOOGLE DROIDs, customer premises equipment, or any other suitable endpoint. Note that servers 12a-b (previously identified in FIG. 1A) may also be integrated with or coupled to an edge cache, gateway, CDN 80, or any other network element. In certain embodiments, servers 12a-b may be integrated with customer premises equipment (CPE), such as a residential gateway (RG). Content chunks may also be cached on an upstream server or cached closer to the edge of the CDN. For example, an origin server may be primed with content chunks, and a residential gateway may also fetch and cache the content chunks.

As identified previously, a network element can include software (e.g., buffer monitor function 28, request timing control function 30, and/or segmenting boundary control function 32, etc.) to achieve the randomization operations, as outlined herein in this document. In certain example implementations, the randomization functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors 24a and 24b shown in FIGS. 1B and 1C], or other similar machine, etc.). In some of these instances, a memory element [memory 26a and 26b shown in FIGS. 1B and 1C] can store data used for the operations described herein. This includes the memory element being able to store instructions (e.g., software, code, etc.) that are executed to carry out the activities described in this Specification. The processor (e.g., processors 24a and 24b) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the randomization activities, as outlined herein. Additionally, each of these devices may include a processor that can execute software or an algorithm to perform the randomization activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

Each of the network elements can also include suitable interfaces for receiving, transmitting, and/or otherwise communicating data or information in a network environment.

Note that while the preceding descriptions have addressed smooth-like segment sizes, the present disclosure could equally be applicable to other technologies. For example, Dynamic Adaptive Streaming over HTTP (DASH) is a multimedia streaming technology that could benefit from the techniques of the present disclosure. DASH is an adaptive bitrate streaming technology, where a multimedia file is partitioned into one or more segments and delivered to a client using HTTP. A media presentation description (MPD) can be used to describe segment information (e.g., timing, URL, media characteristics such as video resolution and bitrates). Segments can contain any media data and could be rather large. DASH is audio/video codec agnostic. One or more representations (i.e., versions at different resolutions or bitrates) of multimedia files are typically available, and selection can be made based on network conditions, device capabilities, and user preferences to effectively enable adaptive bitrate streaming. In these cases, communication system 10 could perform randomization based on the individual client needs.

On another note, in DASH, an ABR client can ask for a byte range (i.e., rather than the whole segment, it can ask for a subsegment (e.g., the first two GOPs inside that segment)). Stated in different terminology, clients have flexibility in terms of what they ask for (i.e., how much data). If the size of each (byte-range) request is varied on the client side by modifying the client behavior, the same randomization effect can be achieved. This is similar to changing the request time on the client side, but not the same mechanism. In such an instance, what is not being changed is when the clients ask for a byte range. Instead, the architecture can change the size of the byte range (i.e., changing the size of the range). Consequently, the request times would vary as well since fetches will take a variable delay.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its techniques) are readily scalable and, further, can accommodate a large number of components, as well as more complicated/sophisticated arrangements and configurations. Accordingly, the examples provided should not limit the scope or inhibit the broad techniques of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving video data at an adaptive bitrate (ABR) client that includes a buffer;
   determining whether a buffer level for the buffer is below a target buffer level;
   applying a pseudo-random delay for a fetch interval associated with requesting the video data, wherein the pseudo-random delay is directly added to the fetch interval;
   providing a pseudo-random jitter for the target buffer level for the ABR client, wherein the pseudo-random jitter is based, at least in part, on a particular segment size associated with the video data, wherein the particular segment size has been pseudo-randomly selected relative to other segment sizes associated with the video data, and wherein the pseudo-random jitter allows the ABR client to toggle between performing a subsequent fetch to fill UP the buffer and attempting to drain the buffer; and
   requesting a next segment of the video data after the pseudo-random delay, wherein the next segment is encoded by varying both a number of groups of pictures within the next segment and a number of frames in each of the groups of pictures within the next segment relative to other segments of the video data.

2. The method of claim 1, wherein the pseudo-random delay provides for a plurality of fetch times to become decorrelated from each other.

3. The method of claim 1, further comprising:
   determining whether additional jittering should be applied to the buffer level; and
   selecting a new target buffer level for the ABR client.

4. The method of claim 1, wherein the pseudo-random delay is based on a pseudo-random number uniformly distributed between a first time interval and a second time interval, and wherein the first time interval and the second time interval are based in seconds.

5. The method of claim 1, wherein the ABR client does not reach its steady-state mode as a result of the pseudo-random jitter.

6. The method of claim 1, wherein the pseudo-random jitter is based, at least in part, on a particular format associated with the video data.

7. One or more non-transitory tangible media comprising code for execution and when executed by a processor performs operations comprising:
   receiving video data at an adaptive bitrate (ABR) client that includes a buffer;
   determining whether a buffer level for the buffer is below a target buffer level;
   applying a pseudo-random delay for a fetch interval associated with requesting the video data, wherein the pseudo-random delay is directly added to the fetch interval;
   providing a pseudo-random jitter for the target buffer level for the ABR client, wherein the pseudo-random jitter is based, at least in part, on a particular segment size associated with the video data, wherein the particular segment size has been pseudo-randomly selected relative to other segment sizes associated with the video data, and wherein the pseudo-random jitter allows the ABR client to toggle between performing a subsequent fetch to fill UP the buffer and attempting to drain the buffer; and
   requesting a next segment of the video data after the pseudo-random delay, wherein the next segment is encoded by varying both a number of groups of pictures within the next segment and a number of frames in each of the groups of pictures within the next segment relative to other segments of the video data.

8. The one or more non-transitory tangible media of claim 7, wherein the pseudo-random delay provides for a plurality of fetch times to become decorrelated from each other.

9. The one or more non-transitory tangible media of claim 7, wherein when executed by the processor further performs operations comprising:
   determining whether additional jittering should be applied to the buffer level; and
   selecting a new target buffer level for the ABR client.

10. The one or more non-transitory tangible media of claim 7, wherein the pseudo-random delay is based on a pseudo-random number uniformly distributed between a first time interval and a second time interval, and wherein the first time interval and the second time interval are based in seconds.

11. The one or more non-transitory tangible media of claim 7, wherein the ABR client does not reach its steady-state mode as a result of the pseudo-random jitter.

12. The one or more non-transitory tangible media of claim 7, wherein the pseudo-random jitter is based, at least in part, on a particular format associated with the video data.

13. An adaptive bitrate (ABR) client comprising:
   at least one processor coupled to a buffer;
   the buffer being configured to receive video data; and
   the at least one processor being configured to:
      determine whether a buffer level for the buffer is below a target buffer level;
      apply a pseudo-random delay for a fetch interval associated with requesting the video data, wherein the pseudo-random delay is directly added to the fetch interval;
      provide a pseudo-random jitter for the target buffer level for the ABR client, wherein the pseudo-random jitter is based, at least in part, on a particular segment size associated with the video data, wherein the particular segment size has been pseudo-randomly selected relative to other segment sizes associated with the video data, and wherein the pseudo-random jitter allows the ABR client to toggle between performing a subsequent fetch to fill up the buffer and attempting to drain the buffer; and
      request a next segment of the video data after the pseudo-random delay, wherein the next segment is encoded by varying both a number of groups of pictures within the next segment and a number of frames in each of the groups of pictures within the next segment relative to other segments of the video data.

14. The ABR client of claim 13, wherein the pseudo-random delay provides for a plurality of fetch times to become decorrelated from each other.

15. The ABR client of claim 13, wherein the at least one processor is further configured to:
   determine whether additional jittering should be applied to the buffer level; and
   select a new target buffer level for the ABR client.

16. The ABR client of claim 13, wherein the pseudo-random delay is based on a pseudo-random number uniformly distributed between a first time interval and a second time interval, and wherein the first time interval and the second time interval are based in seconds.

17. The ABR client of claim 13, wherein the ABR client does not reach its steady-state mode as a result of the pseudo-random jitter.

18. The ABR client of claim 13, wherein the pseudo-random jitter is based, at least in part, on a particular format associated with the video data.

* * * * *